March 23, 1926.
W. KATH
RECORDING VENTURI METER
Filed August 24, 1921
1,577,909
Fig. 1
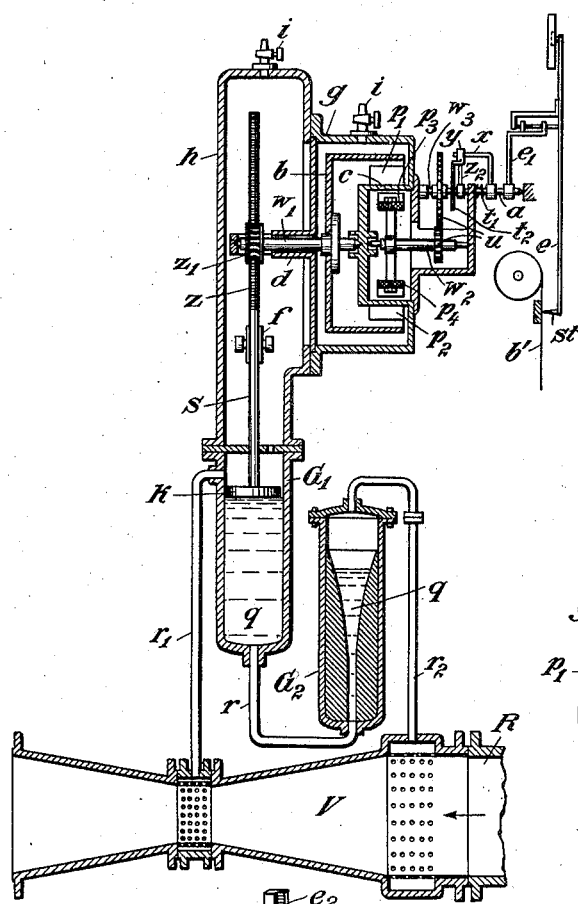
Fig. 2
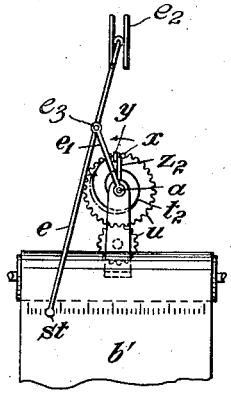
Fig. 3
Fig. 4
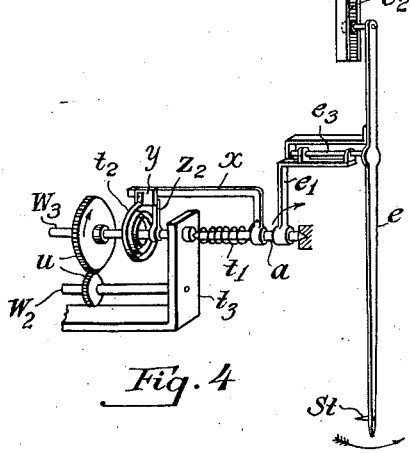
Inventor
Willy Kath
by Knight Bro
attorneys Patented Mar. 23, 1926.

1,577,909

UNITED STATES PATENT OFFICE.

WILLY KATH, OF BERLIN-FRIEDENAU, GERMANY, ASSIGNOR TO SIEMENS & HALSKE, AKTIENGESELLSCHAFT, OF SIEMENSSTADT, NEAR BERLIN, GERMANY, A GERMAN CORPORATION.

RECORDING VENTURI METER.

Application filed August 24, 1921. Serial No. 494,985.

*To all whom it may concern:*

Be it known that WILLY KATH, a citizen of the German Empire, residing at Berlin-Friedenau, Germany, has invented certain new and useful Improvements in a Recording Venturi Meter (for which he has filed applications in Germany, December 23, 1914, Patent No. 292342; Sweden, September 8, 1915, Patent No. 42850; Switzerland, September 17, 1915, Patent No. 72396; Norway, September 17, 1915; Austria, December 7, 1915, Patent No. 76665; Italy, December 10, 1915, Patent No. 151715/132–506; Czechoslovakia, April 28, 1920, Ser. No. 3198/20; France, June 21, 1920, Patent No. 517549; Belgium, June 23, 1920, Patent No. 287822; Japan, June 25, 1920, Patent No. 38361), of which the following is a specification.

My invention refers to a Venturi meter the indications of which are recorded on a recording strip. The transmission of the pressure drop in the Venturi tube upon the recording arrangement is effected by connecting communicating vessels containing mercury to points of different pressure existing in the Venturi tube. In one of the vessels a float is provided which moves in proportion to the pressure drop in the Venturi tube, the movement of this float being transmitted upon the spindle of a recording mechanism by means of a toothed rack. In the types of Venturi meters of this kind usually employed, the rotary spindle passes to the outside through a stuffing box. This arrangement is not to be recommended because the friction inside this stuffing box is considerable and is even variable in time whereby the indications of the instrument on the paper strip are influenced considerably.

According to my present invention these disadvantages are overcome by avoiding altogether a passage from the water-filled chamber into the air-filled chamber, the transmission of the torque being effected at this point by means of a magnetic coupling specially adapted to meet the requirements of the case.

The transmission gears employed in such cases are preferably constructed in such manner that the path traversed by the recording element is approximately equal to the path traversed by the float, whereas the path traversed by the magnetic coupling is a multiple of the aforementioned float path.

Magnetic couplings per se are known in the art for the purpose of transmitting the motion in various kinds of water meters or also of meters such as are described in the present application. In these known arrangements, however, the elements, comprising the magnetic coupling, only traverse the same angle as the indicator.

If in such cases only very small forces are transmitted, no difficulties are encountered in designing a satisfactory direct magnetic coupling arrangement to reliably transmit the forces to the indicator. However, if the purpose of transmitting somewhat larger forces is concerned, such as are required for the operation of a writing mechanism, the magnetic coupling forces must also be increased. This leads to comparatively large and heavy couplings with correspondingly greater bearing friction which exert a material influence upon the sensitiveness of the meter. Moreover, if the magnets are made heavy the other dimensions of the meter are likewise increased so that the cost of production becomes disproportionately high.

The transmission of forces becomes still more difficult if the movement of the mercury column is to be recorded to the full extent or even on a larger scale, as in such case the forces to be transmitted are greatest. Here it is very essential that the friction losses be reduced to a minimum and that the effect of the long distance through which the coupling parts have to travel, is rendered harmless as much as possible. During the oscillating movement of the coupling the armature carried along by the magnet will lag behind in the one or other direction owing to the air gap provided for the partition wall thus adding a further cause for inaccurate recording.

According to the present invention the transmission is arranged in such a way that the linear movements of the float are augmented by means of a rack and a very small pinion to double or treble their value at the circumference of the magnetic coupling. They are then transferred magnetically to a recording mechanism, but they are previously stepped-down again by gear wheel and lever transmission arrangements to approximately the original linear value so that the travel of the pointer equals at least the traveling speed of the float. As the result of this arrangement the magnetic coupling only has to transmit a fraction of the force necessary for the direct driving of the recording mechanism. For this reason the magnets may be kept small and light. Moreover, the lost motion is neutralized down to a corresponding fraction. Consequently, the sensitiveness of the transmission device is very high.

The accompanying drawings represent by way of example a measuring apparatus according to the present invention, Fig. 1 showing a longitudinal vertical section, Fig. 2 being a view of the recording and writing arrangement, Fig. 3 illustrating the magnetic coupling, and Fig. 4 representing in larger scale a perspective view of the apparatus portion shown in Fig. 2.

A Venturi tube V is connected into the pipe line R. To the narrowest point of this Venturi tube as also the widest point preceding in the direction of the flow of the liquid, tubes $r_1$ and $r_2$ are connected which are joined to the vessels $G_1$ and $G_2$ communicating with each other by a connecting pipe $r$. The communicating interior of these vessels is filled with mercury $q$ which, in the vessel $G_1$, carries a piston float $k$. The piston rod $s$ is provided with a toothed rack $z$ surrounding it like rings, which engages a comparatively small pinion $z_1$ mounted on the spindle $w_1$. This pinion serves at the same time for guiding the rod $s$ in front, a guide roller $f$ being provided for this purpose to the rear. These elements are housed in chamber $h$ mounted on top of vessel $G_1$ and containing water or the fluid otherwise carried by the Venturi tube at the pressure existing at the throat of the tube.

The spindle $w_1$ carries a drum-shaped support $b$ for two diametrically arranged permanent magnets $p_1$, $p_2$. (Fig. 3.) In the track of these magnets either an ordinary armature or else a second pair of magnets, $p_3$, $p_4$ is provided which pair is mounted upon a second rotating spindle $w_2$. This spindle is connected by a train of gears $u$ with a further shaft $w_3$ imparting motion to the ellipsoid guide lever $e$ which carries the pencil $st$ (Figs. 2 and 4). Lever $e$ is guided at its upper end in slide $e_2$ and pivoted intermediate its ends at $e_3$ on an arm $e_1$ fixed to shaft $a$. The coupling between shafts $a$ and $w_3$ will be described presently. The pencil $st$ moves upon the strip of paper $b'$ in a straight line. The coupling magnets are separated by a thin partition wall $c$ forming a portion of the casing $g$ which is attached to chamber $h$ containing the toothed rack driving mechanism in such a way that it remains likewise filled with water or other fluid contained in chamber $h$. But in order to avoid renewal of the water in casing $g$, the shaft $w_1$ is surrounded by a long bushing $d$ fitting as closely as possible over the shaft and serving as a long gasket without shaft and bushing being in direct contact with one another. After the two casings $g$ and $h$ have been filled with water by opening the ventcocks $i$, the water inside the coupling chamber $g$ will be closed off almost entirely and will remain at rest. This arrangement avoids bringing fresh water containing air in contact with the magnets which would gradually cause them to rust with the effect of impairing their action.

The casing $g$ is fixed to the casing $h$ in an easily detachable manner so that in case of failure of the magnetic coupling, it may easily be removed to facilitate repairs or replacement of the coupling.

As the magnetic forces of the coupling, on account of its comparatively small size, are very small, the connection of the coupling with the curve drawing arrangement must be carefully protected by a special arrangement to prevent the coupling from falling out of step in case of a forcible displacement of the writing mechanism such as may occur when the pen is refilled with ink. To this effect, as shown more specifically in Fig. 1, the spindle $w_3$ is connected by a special coupling to the axle $a$ carrying the connecting guide member $e_1$ of the elliptic guide lever. The spring $t_1$ fastened at one end of frame portion $t_3$ pushes with its other end an arm $x$ fastened to the spindle $a$ against a stop $y$ in opposite direction to the movement indicated by the arrow at $e_1$ in Fig. 4. This stop $y$ is pressed firmly against an arm $z_2$ fixed to the spindle $w_3$, by means of a helical spring $t_2$, whose inner end is attached to shaft $w^3$. Consequently, the movements of the spindle $w_3$ are only transmitted to the curve-drawing arrangement in opposition to the force of the spring $t_1$ by the parts $z_2$, $y$, $x$, which are placed firmly the one against the other. However, if the pencil is moved forcibly, either the arm $x$ is simply lifted off the coupling parts of the spindle $w_3$, or else it moves the stop $y$ slightly backward in opposition to the force of the spring $t_2$. This type of connection of the two shafts has the additional advantage that the forces of the springs which may alter considerably under the influence of temperature, etc. will in no way affect the transmission of the movement.

Having now described my invention, what I claim as new and desire to secure by Letters Patent is:—

1. Venturi meter of the type described comprising a pressure chamber, containing a float supported by the liquid in said chamber, a spindle geared to said float, a second spindle revolvably mounted at the outside of the pressure chamber, a rotary magnetic coupling between the first and the second spindle, a third spindle geared to the second spindle and a recording element operatively connected to said third spindle, the gearing between said magnetic coupling and said float being stepped up towards said coupling, and the gearing between said third and second spindle being stepped down toward the third spindle to cause said coupling to perform a plurality of revolutions for each revolution of said third spindle, whereby the torque transmitted is reduced at said coupling to a sub-multiple of the torque required at the third spindle to operate the recording instrument.

2. Venturi meter of the type described comprising a pressure chamber, containing a float supported by the liquid in said chamber, a rack-bar fixed to said float, a spindle carrying a comparatively small pinion meshing with said rack-bar, a second spindle revolvably mounted at the outside of the chamber, a magnetic coupling between the first and the second spindle, a recording element and a third spindle operatively connected therewith, a comparatively small pinion on the second spindle, and a larger pinion on the third spindle meshing with said smaller pinion, said gearing causing said coupling to perform a plurality of revolutions for each revolution of said third spindle whereby the torque transmitted by said coupling is reduced to a sub-multiple of the torque necessary at the third spindle to operate the recording instrument.

3. Venturi meter of the type described comprising a pressure chamber, containing a float supported by the liquid in said chamber, a rack-bar fixed to said float, a spindle carrying a comparatively small pinion meshing with said rack-bar, a second spindle revolvably mounted at the outside of the pressure chamber, a rotary magnetic coupling between the first and the second spindle, a recording element and a third spindle operatively connected therewith, gearing between the second and the third spindle, the gearing between said float and said coupling and between said third and second spindles being suitably dimensioned respectively to increase the circumferential path of said coupling to a multiple of the float path and to reduce the path of said recording element relatively to the path of the coupling to approximate equality with the float path for the purpose of reducing the torque which said coupling is required to transmit.

4. Venturi meter of the type described comprising a pressure chamber containing a float supported by the liquid in said chamber, a casing attached to said pressure chamber, a spindle journalled at one end in said chamber and having its other end extending into said casing, a rack-bar on said float and a small pinion on said spindle and in mesh with said rack bar, a long bushing mounted in the partition wall between the casing and the pressure chamber surrounding the spindle without direct contact with the bushing wall, a drum mounted on said spindle and disposed in said casing, permanent magnets on said drum, the path traversed by said magnets being a multiple of the path traversed by said float, a second spindle revolvably mounted at the outside of said casing, permanent magnets on said second spindle magnetically coupled with the first mentioned, magnets, a recording element and a third spindle operatively connected therewith gearing between the second and the third spindle, the gearing between said float and said coupling and between said third and second spindles being suitably dimensioned respectively to increase the circumferential path of said coupling to a multiple of the float path and to reduce the path of said recording element relatively to the path of the coupling to approximate equality with the float path for the purpose of reducing the torque which said coupling is required to transmit.

5. Venturi meter of the type described comprising a pressure chamber containing a float supported by the liquid in said chamber, a casing attached to said pressure chamber, a ventcock on the top of said casing, a spindle journalled at one end in said chamber and having its other and extending into said casing, a rack-bar on said float and a small pinion on said spindle and in mesh with said rack-bar, a long bushing mounted in the partition wall between the casing and the pressure chamber surrounding the spindle without direct contact with the bushing wall, a drum mounted on said spindle and disposed in said casing, permanent magnets on said drum, the path traversed by said magnets being a multiple of the path traversed by said float, a second spindle revolvably mounted at the outside of said casing, permanent magnets on said second spindle magnetically coupled with the first mentioned magnets, a recording element and a third spindle operatively connected therewith, gearing between the second and the third spindle, the ratio between said float path and said coupling path being increased and the gearing ratio between said third and second spindle being decreased to increase the circumferential path of said coupling to a multiple of the float path for the purpose of reducing the torque which said coupling is required to transmit, the gearing between said second and third spindle being reduced sufficiently to render the path of said recording element approximately equal to the float path.

6. Venturi meter of the type described comprising a pressure chamber containing a float supported by the liquid in said chamber, a casing attached to said pressure chamber, a spindle journalled at one end in said chamber and having its other end extending into said casing, a rack-bar on said float and a small pinion on said spindle and in mesh with said rack-bar, a long bushing mounted in the partition wall between the casing and the pressure chamber surrounding the spindle without direct contact with the bushing wall, a drum mounted on said spindle and disposed in said casing, permanent magnets on said drum, the path traversed by said magnets being a multiple of the path traversed by said float, a second spindle revolvably mounted at the outside of said casing, permanent magnets on said second spindle magnetically coupled with the first mentioned magnets, a recording element and a third spindle operatively connected therewith, gearing between the second and the third spindle, the ratio between said float path and said coupling path being increased and the gearing ratio between said third and second spindle being decreased to increase the circumferential path of said coupling to a multiple of the float path for the purpose of reducing the torque required to be transmitted by said coupling, the gearing between said second and third spindle being reduced sufficiently to render the path of said recording element approximately equal to the float path, and a yielding coupling inserted between said recording element and said third spindle for transmitting the rotary motion of said spindle to said element, said coupling being capable of yielding to forcible relative movement between said element and said spindle by outside forces.

In testimony whereof I affix my signature.

WILLY KATH.